United States Patent [19]
Costa et al.

[11] Patent Number: 5,554,858
[45] Date of Patent: Sep. 10, 1996

[54] SEGMENTED POSITION SENSING DETECTOR FOR REDUCING NON-UNIFORMLY DISTRIBUTED STRAY LIGHT FROM A SPOT IMAGE

[75] Inventors: Pat V. Costa, Nissequogue; William E. Yonescu, Smithtown; Donald Fritz, Coram, all of N.Y.

[73] Assignee: Robotic Vision Systems, Inc, Hauppauge, N.Y.

[21] Appl. No.: 310,841

[22] Filed: Sep. 22, 1994

[51] Int. Cl.$^6$ .................................................. G01V 8/00
[52] U.S. Cl. .................... 250/559.29; 250/206.2; 250/559.31; 356/3.01
[58] Field of Search ........................... 250/201.6, 203.1, 250/203.2, 203.3, 203.4, 203.6, 206.1, 206.2, 208.2, 561, 563, 234, 235, 236, 214 R, 214.1, 559.29, 559.31; 356/375, 3, 3.01, 4.01

[56] References Cited

U.S. PATENT DOCUMENTS

| | | | |
|---|---|---|---|
| 4,361,758 | 11/1982 | Rotolo | 250/203 |
| 4,576,481 | 3/1986 | Hansen | 356/375 |
| 4,691,101 | 9/1987 | Leonard | 250/231.16 |
| 5,004,929 | 4/1991 | Kakinoki et al. | 250/561 |
| 5,137,350 | 8/1992 | Misawa et al. | 356/1 |
| 5,210,402 | 5/1993 | Oomen | 250/208.3 |

Primary Examiner—Edward P. Westin
Assistant Examiner—Stephen Calogero
Attorney, Agent, or Firm—Max Fogiel

[57] ABSTRACT

A position sensing detector in which each of a plurality of sensing channels is provided with ends and an output current lead at each end of each channel. A light spot is imaged along the length of the channel. The channels are electrically isolated from each other. The channels may be proportional to a selected keystone pattern, and the channels may be rectangular-shaped and accommodate keystoning effects of an imaged beam.

5 Claims, 6 Drawing Sheets

SEGMENTED POSITION SENSING DETECTOR FOR REDUCING NON-UNIFORMLY DISTRIBUTED STRAY LIGHT FROM A SPOT IMAGE

BACKGROUND OF THE INVENTION

Current three dimensional laser beam triangulation inspection systems use CCD (Charge Coupled Device) linear or rectangular arrays to read the position of a surface to be measured. A position sensing detector (PSD) is an alternative sensing device that offers the benefits of greater sensing element width which is important for scanned beams as well as lower cost and greater speed as a consequence of simpler design and absence of the need to serially clock out a string of data samples. A PSD is an analog device that provides an output current ratio proportional to the position of a light spot falling along its length. The CCD linear or rectangular array provides an output that is an image of light distribution on its surface.

Unfortunately reliable, accurate data is sometimes more difficult to obtain with a PSD than with a CCD because any stray light striking the PSD photo-sensitive surface or surrounding substrate combines with the result generated by the desired measurement light to introduce an error. With CCD's the stray light signals along the length of the array can usually be readily separated from the desired signal since the amplitude distribution of stray light on the CCD array is quite different than that of a focused laser spot. With PSD's, once the undesired light produces a signal, it mixes with the desired signal and can't be removed.

SUMMARY OF THE INVENTION

The current invention uses a Position Sensing Detector in a three dimensional, laser beam triangulation inspection system. The PSD structure is modified to reduce or eliminate the effect of stray light in causing errors in depth measurements of a sample under test.

This is accomplished by segmenting the PSD photosensitive area into a number of channels extending the length of the PSD. The optics of the inspection system are set up so that, when a particular position of a test sample is illuminated, the resultant spot image will fall within a single channel, independent of the depth of the sample at the illuminated position. The effect of stray light due to external illumination or due to multiple reflections of the laser beam falling on other channels is eliminated by activating only one particular channel based on apriori knowledge of the illuminated spot location.

This and other advantages will become more evident when the invention is described in detail.

OBJECT OF THE INVENTION

It is therefore an object of the present invention to provide an apparatus for eliminating the effect of extraneous light signals on certain measurements made by three dimensional inspection systems.

It is a further object to provide an improvement to Position Sensing Detectors to enable them to provide a signal from a light spot on its surface that is independent of a signal generated by another light spot located at certain locations on its surface and on the surrounding substrate.

Yet another object is to accommodate the imaging keystone effect while providing a signal from a light spot on the surface of a Position Sensing Detector that is independent of a signal generated by another light spot located at certain locations on its surface.

Another object is to provide a 3-D inspection system incorporating a multichannel PSD. Other objects and advantages of the present invention will become more apparent upon reference to the following specification and annexed drawings.

DETAILED DESCRIPTION OF THE INVENTION

Figure 1A:
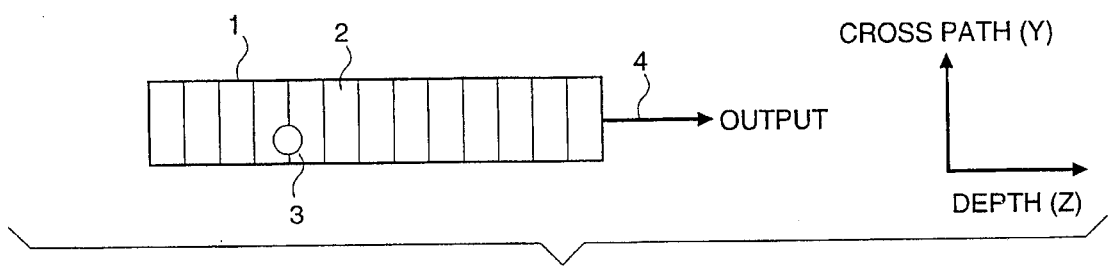
FIG. 1a is a CCD array of the prior art.

FIG. 1a shows a CCD chip 1 of the prior art that builds up charge in any segment 2 that is exposed to light such as an image 3 of a spot of light reflected from a surface. After a specified exposure time, charges built up in segments 2 are clocked out as a train of voltage samples on output line 4. A large number of segments 2 are normally required in order to provide needed resolution of where along chip 1, light spot 3 is located. This requires a comparatively long time to clock out. The same geometry may be used with multiple rows to form a rectangular array that is read out serially, one row at a time, as in a TV camera.

Figure 1B:
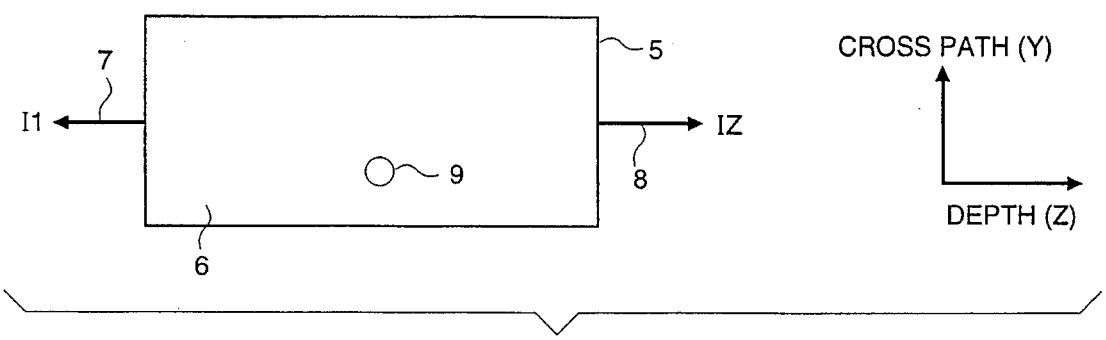
FIG. 1b is a PSD of the prior art.

FIG. 1b shows a Position Sensitive Detector (PSD) 5 of the prior art that can be used to sense the position of light spot 9 along the length of PSD 5 with a shorter time delay than required for clocking out the train of voltage samples of CCD 1. Currents I1 on output lead 7 and I2 on output lead 8 flow in a ratio that depends on the position of light spot 9 along the length of PSD 5 on its light sensitive surface 6. Current I1, linearly increases as light spot 9 travels from the I2 end to the I1 end. Current I2 linearly increases as light spot 9 travels from I1 end to the I2 end.

Deviation from linearity can be adequately compensated by using a look up table or with a second order curve fit. Normalization of the ratio can be provided by dividing one of the currents I1 or I2 by their sum. Position of the light spot is then given as the product of chip length and the normalized ratio. One way the currents can be measured is by integrating the two currents on two capacitors and sampling the two capacitor voltages at the same time (any time skew would introduce an error).

As a consequence of intentionally deflecting the laser beam in a 3-D inspection system to which the CCD and PSD chips are applied, the light spot image 3 or 9 may occur at any location across the width of the chip or along its length. As the width dimension increases, a wider swath of data can be acquired without altering the sensor/inspected part translation; however, there exists a greater chance of intercepting stray light which would introduce a measurement error.

Figure 2:
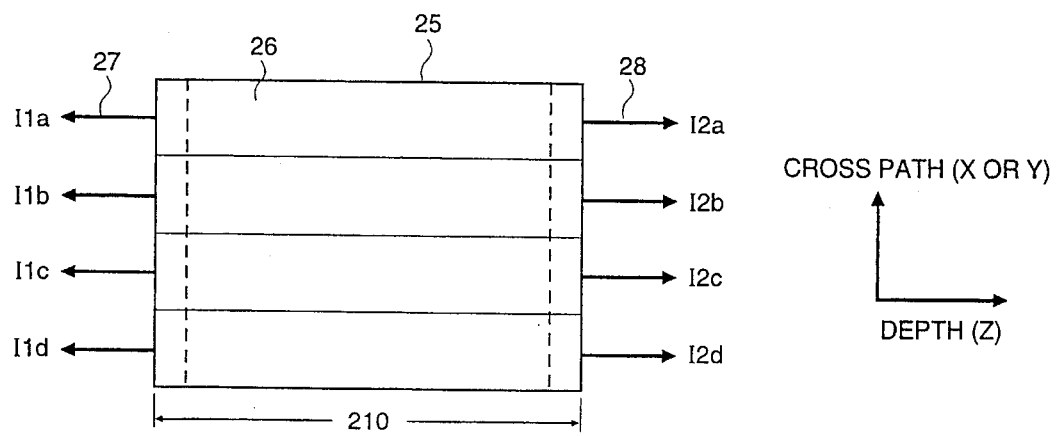
FIG. 2 is a PSD improved with multiple channels.

FIG. 2 introduces a means for enabling a wider PSD sensing surface while reducing the chance of introducing errors due to stray light. PSD chip 25 photosensitive area is divided into electrically isolated channels 26, each with its own current outputs I1a,b, ... and I2a,b, ... on output leads 27 and 28. By minimizing the width of individual channels 26, the probability of stray light influencing the measured light position within that channel is reduced at the expense of some additional read out time if done serially. However, since parallel access to the channels 26 is provided via output leads 27 and 28 for each channel, no time penalty is incurred. Apriori knowledge of the cross path (in the width direction) position of the scanned beam is used to determine which isolated channel contains the desired information.

Stray light striking the substrate, upon which the photosensitive channels 26 are built, introduces current that affects the position readout of the adjacent channel. Optically masking the PSD 25 so that only the central 90% (shown as region 210) can be exposed to light protects against errors introduced by stray light that might have illuminated the substrate at either end. By electrically grounding the first and last channels 26 to form a guard, the central channels are unaffected by stray light striking the side substrate areas.

Figure 3:
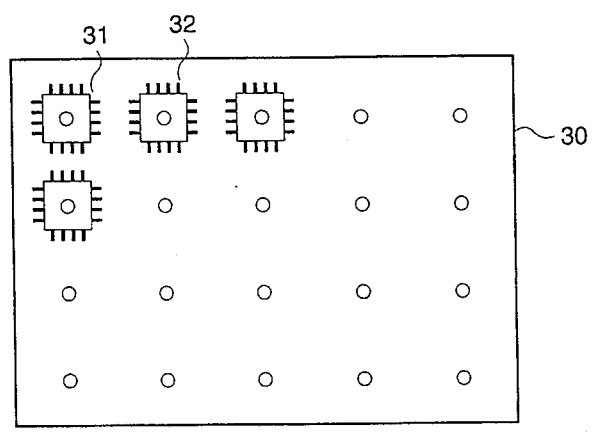
FIG. 3 is a plan view of a tray of semiconductor chips to be inspected.

In one application semiconductor chips 31 are located in inspection trays, a typical one 30 shown in FIG. 3. There is a tolerance on the placement of chips 31 (both for linear and rotational offset from nominal) as well as on their leads 32 which have to be inspected.

Figure 4:
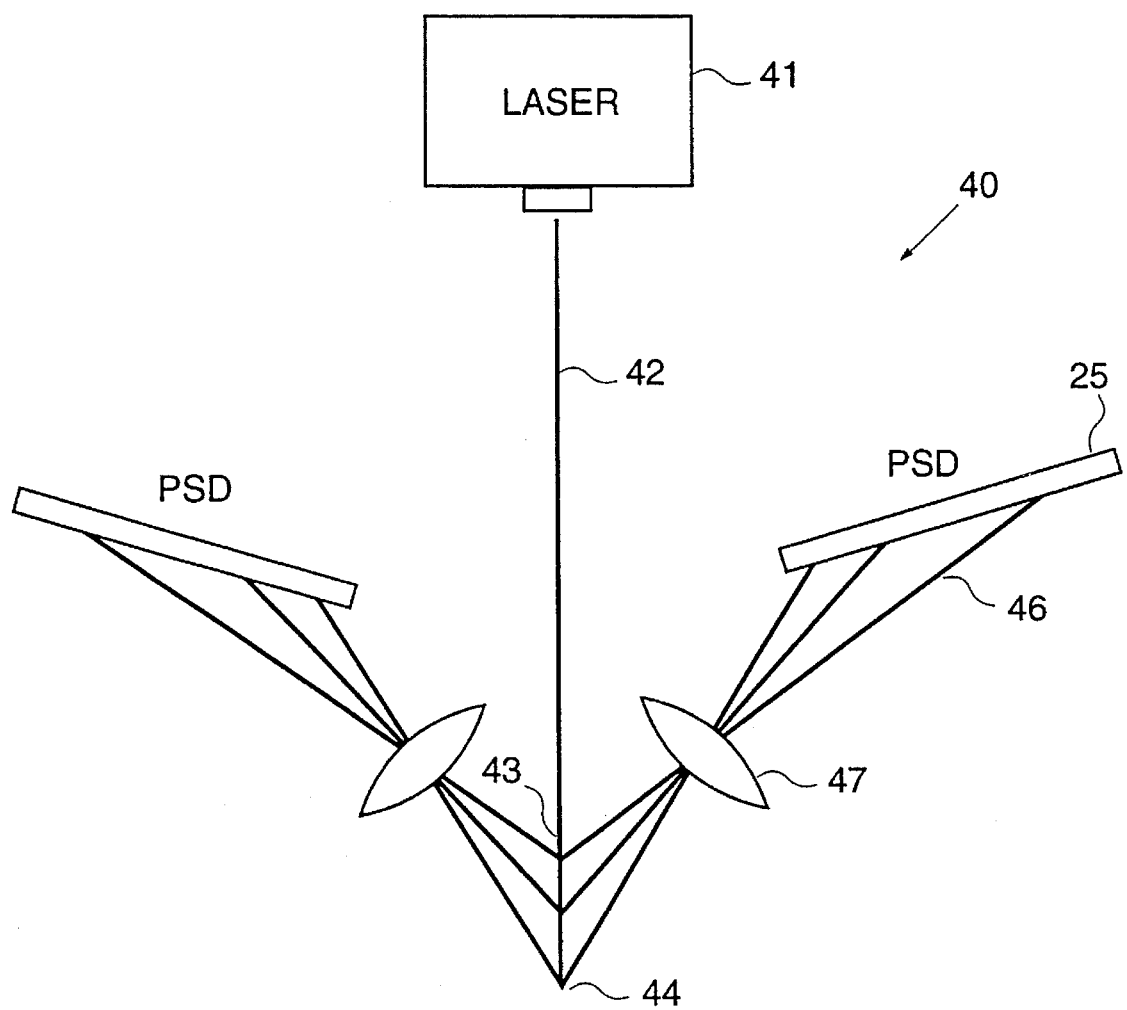
FIG. 4 is a side schematic view of a three dimensional sensor.

FIG. 4 depicts schematically a side view of an inspection sensor 40 for measuring in 3D the chip lead 32 positions. The laser beam is oriented parallel to the vertical Z axis so that errors in Z introduce no error in x-y. Intentional small angular deflection of the beam to acquire additional data, accommodate part positioning, and dimensional tolerance introduce a small error. A laser 41 projects a narrow light beam 42 down onto the inspection tray that is placed so that the chip leads 32 fall in the inspection depth range from a minimum 43 to a maximum 44. PSD sensors 25 are placed on both sides of beam 42 to view the light reflecting off leads 32. The reflected light rays 46 are imaged on PSD 25 by lens 47. An acousto-optic deflector within laser 41 pivots beam 42 in a plane orthogonal to the drawing to enable measurements slightly in front of and behind the plane of the drawing. This enables a path wide enough to accommodate some placement and part tolerances relative to a nominal position as well as obtain a swath of data.

The inspection depth 43,44 is imaged along the length of the PSD 25 (indicated as the depth (z) direction in FIG. 2 ). The pivoting of the beam 42 is imaged across the width of PSD 25 (indicated as the cross path (x or y) direction in FIG. 2).

Figure 5:
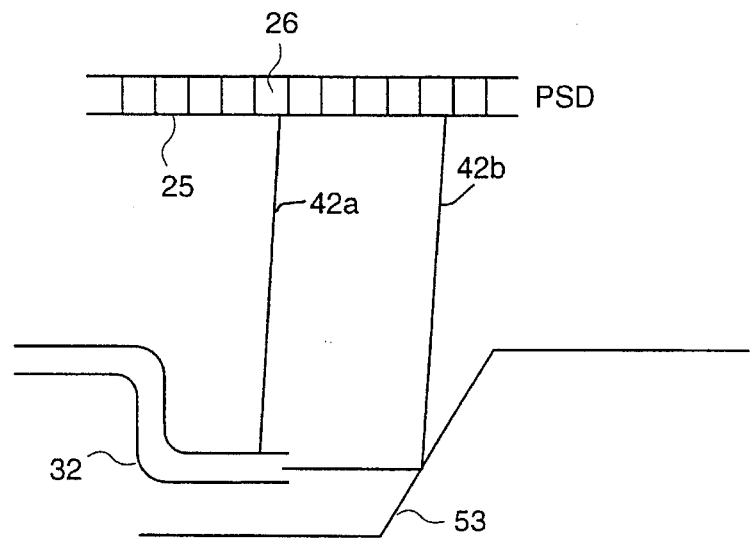
FIG. 5 is a schematic side view of a chip lead, reflecting surface and imaging chip.

In inspecting the leads 32 of chips 31 there are many ways in which stray light will reach the PSD 25. FIG. 5 illustrates one instance without introducing the details of the imaging optics. When laser beam 42 is at location 42a, it reflects off of a surface 53 (part of tray 30 or another chip 31), reflects off lead 32, reflects again off surface 53 and images to one of PSD 25 channels 26 representative of a 3-D point in the inspection volume not necessarily located at the point of first reflection of beam 42. Because the signals I1 and I2 of each channel 26 are isolated from one another, the channel 26 receiving the primary image is uncorrupted by the images reaching other channels. The system using the multichannel PSD is thereby capable of greater accuracy and reliability. In very bad situations the light reflected in the direction of surface 53 grazes a diffuse surface which then is imaged to several channels. Without the electrical isolation a substantial error would occur.

Figure 6:
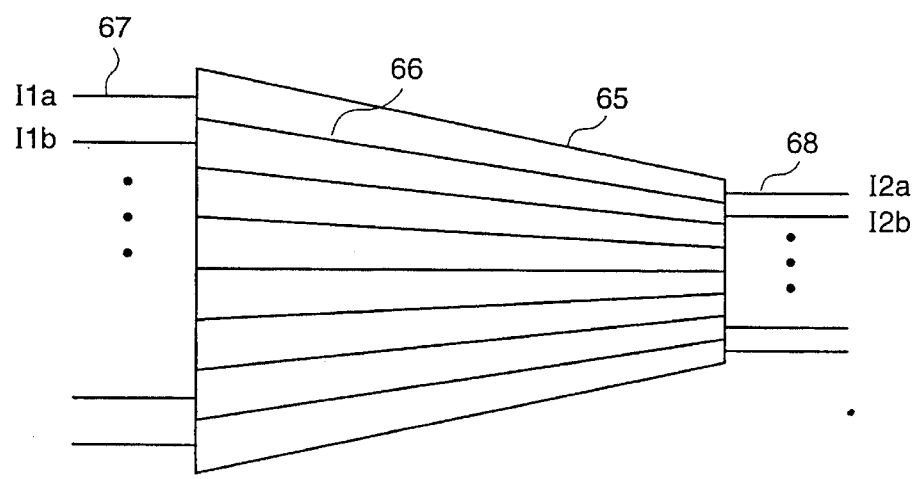
FIG. 6 is a PSD with multiple channels formed to accommodate keystone distortion.

A multichannel PSD used in an inspection sensor 40 of FIG. 4 normally encounters keystoning. If rectangular channels are formed on PSD 25 such as shown as channels 26 in FIG. 2, laser beam 42 will image to a line not parallel to channels 26. PSD 25 can be aligned so that the nominal (non-deflected) image of beam 42 is parallel to channels 26 and centered on chip 25. As beam 42 is deflected, however, its image will move toward the edge of PSD 25 and will no longer be parallel to channels 26 as a result of keystoning. Since it is desirable to make channels 26 as narrow as the beam 42 image, the image will not be wholly contained in any one channel 26. This may be detrimental to performance and may be corrected by forming the channels 26 into a keystone pattern as shown as channels 66 in FIG. 6. PSD 65 is in all other ways similar to PSD 25, having output currents I1 and I2 for each channel 66 appearing on output leads 67 and 68 respectively. By careful design and alignment, beam 42 will image to a single channel 66 for all angles of deflection.

Figure 7:
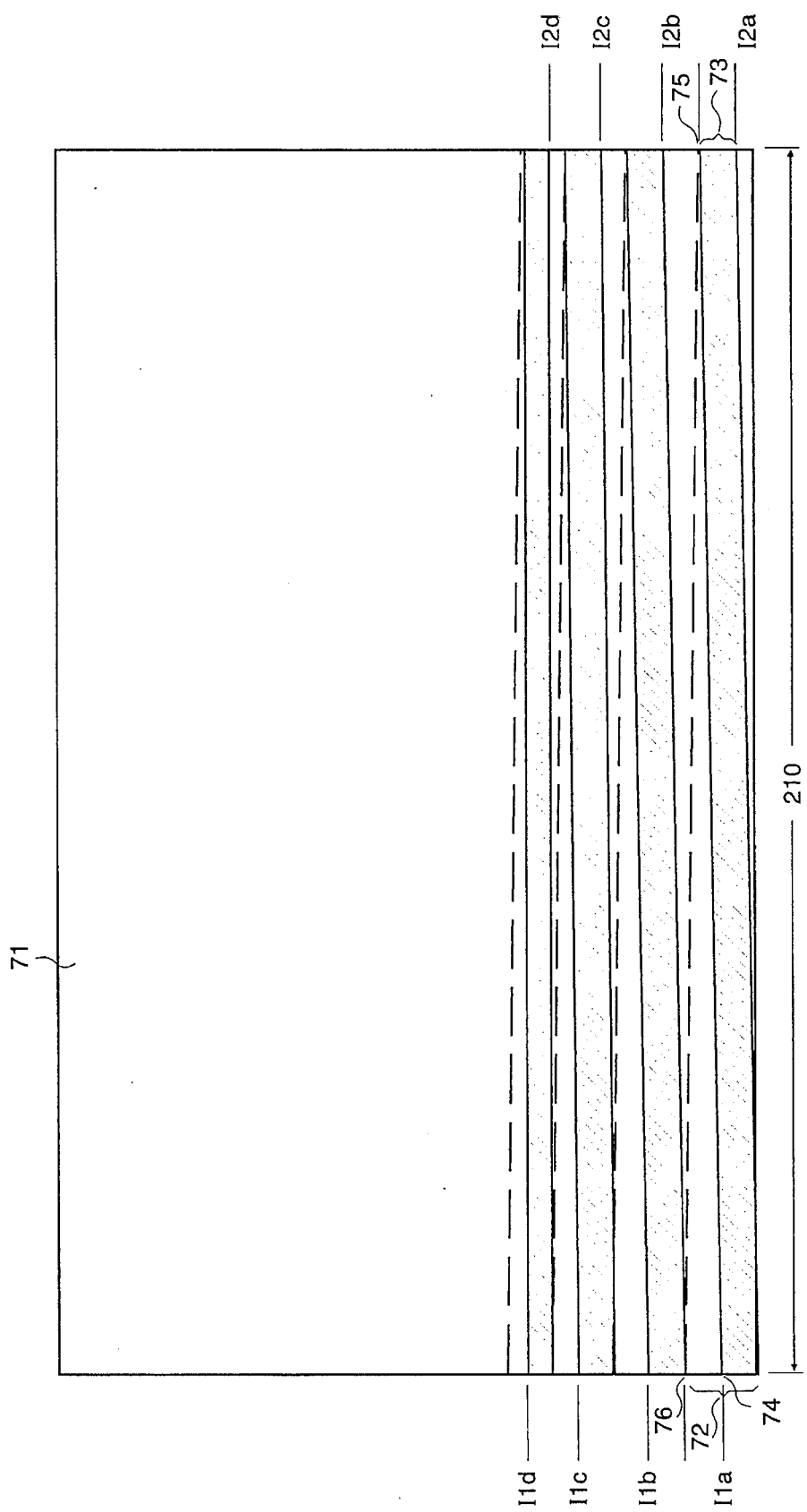
FIG. 7 is a PSD with rectangular channels arranged to accommodate keystone distortion.

As an alternative to forming the channels in a keystone pattern, a rectangular channel pattern may be used as shown in FIG. 7. The PSD 71 is formed from isolated channels 72 with interchannel isolation shown as dotted lines. Solid areas 73 show the regions within a channel where the beam image may fall. The minimum width of the channel is determined by the slope of the spot swath. The top edge of the swath rises from a cross path intercept at point 74 to an intercept at point 75 as the spot moves across the PSD length 210. The bottom edge of the adjacent channel should be positioned no lower than point 76 which has the same cross path intercept as point 75. Geometrical simplicity is traded for PSD chip area.

When positioning either system 40 or tray 30 to inspect leads 32 on chips 31, consideration should be given to avoiding any known positions that may introduce stray light into a measurement. Since even narrow channels 66 are susceptible to stray light entering the channel containing the desired measurement.

By integrating the output currents of PSD 25 (or 65) on capacitors until the voltage of at least one output reaches a set value, weak signals will integrate longer. (This is equivalent to taking a multiplicity of samples reducing the effects of momentary fluctuations.) The longer integration and subsequent predetermined voltage level provides adaptability to produce reliable signals for measurements.

Figure 8:
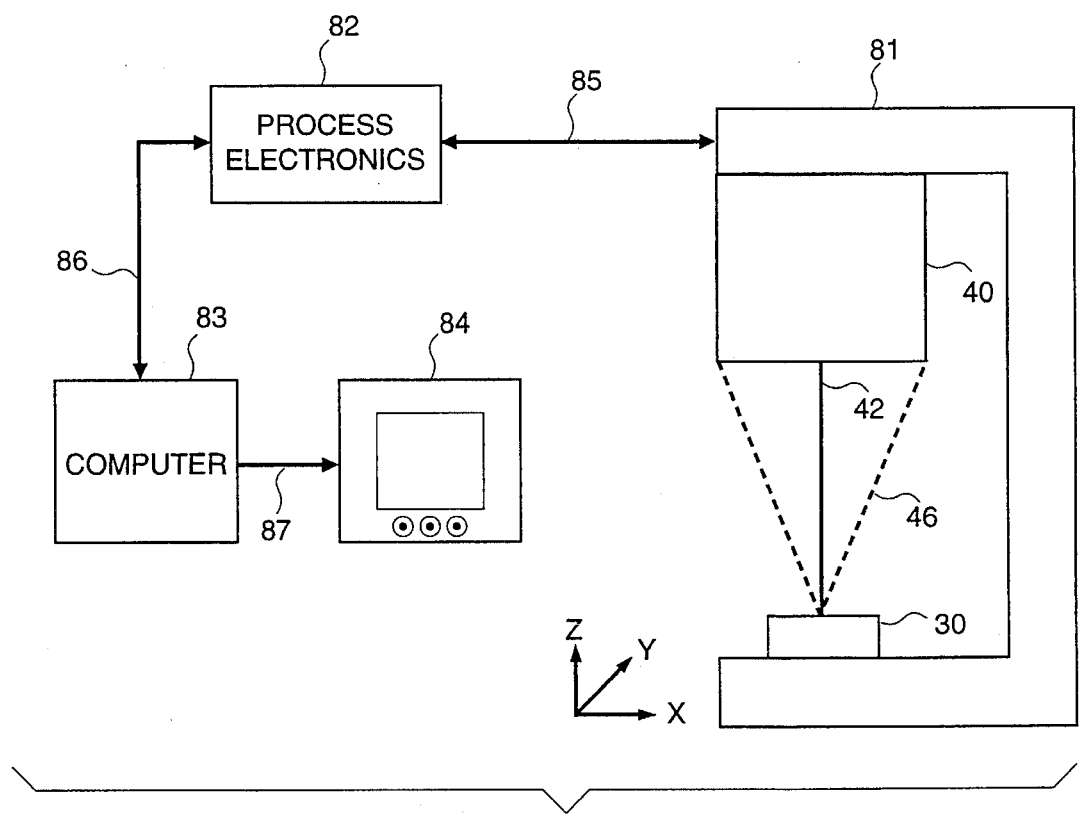
FIG. 8 is 3-D inspection system incorporating the sensor shown in FIG. 4.

A complete 3-D inspection system incorporating multichannel PSDs is shown in FIG. 8. Three-D sensor 40 already described in FIG. 4 is mounted to a frame 81 that provides translation motion to sensor 40 and/or tray 30 to position laser beam 42 to various locations within tray 30. Commercially available linear motion tables mounted to frame 81 can transport sensor 40 and/or tray 30 under motion control orders from Process Electronics 82 via command/data line 85. Reflected laser beam light rays 46 are imaged on multichannel PSD's within sensor 40 as previously described. Process Electronics 82, via command/data line 85, directs the laser within sensor 40 to emit beam 42, directs beam 42 to deflect to a specific angle transverse to the motion imparted by frame 81 to sensor 40 and/or tray 30, selects the channel in each PSD within sensor 40 that images beam 42 at that specific angle, and reads out the current ratio from each selected channel. The current ratio represents the depth of the surface being inspected along the z axis. The z axis is parallel to laser beam 42 by design. The x and·y location of the surface point being measured are given by the laser beam 42 position commanded by Process Electronics 82 to the linear motion tables. The x, y and z locations can be established by design or via well known calibration procedures which move a surface through the inspection volume in precision increments while recording the system outputs.

Computer 83 provides the inspection path information to Process Electronics 82 which generates the motion control orders and receives the x, y, z values associated with each measured point via command/data line 86 to/from Processing Electronics 82. Computer 83 then generates inspection reports for hardcopy and/or display on monitor 84. An interface control such as a keyboard is part of Computer 83 to enable an operator to select operational modes.

What is claimed is:

1. A position sensing detector comprising: a plurality of sensing channels; each channel having ends and a length between said ends; means for imaging a light spot having a width; each channel having a width equal to or less than the width of the light spot being imaged so that a single reflected spot falls within a single channel; an output current lead at each end of each channel; means for imaging the light spot along the length of said channel; said channels being electrically isolated from each other; a channel being activated dependent on an object location from which light is reflected, stray light appearing in unactivated channels being extracted from a desired signal in the activated channel, said channels having a geometry for interacting with a single light spot to produce an output electrical signal representing position of the spot unaffected by non-uniformly distributed stray light; electrical signals being generated in all channels simultaneously.

2. A position sensing detector as defined in claim 1, wherein said channels are proportional to a selected keystone pattern.

3. A position sensing detector as defined in claim 1, wherein said channels are rectangular-shaped and accommodate keystoning effects of an imaged beam.

4. A position sensing detector as defined in claim 1, wherein said channels have outer-most channels, the output current leads of said outer-most channels being connected to signal ground potential.

5. A three-dimensional inspection system comprising: a laser source for projecting a narrow laser beam of light; means for deflecting said laser beam through small angles; a position sensing detector having a plurality of electrically isolated channels, each of said channels having a length; means for imaging light reflected from said laser beam upon said position sensing detector and imaging a light spot at a position along the channel length; each of said channels generating two electrical currents in a ratio proportional to the position of a light spot along said channel length; means for selecting a channel having a current ratio indicating the position of said laser beam reflected from a surface; means for deselecting channels with output generated substantially by localized peaks of stray light; means for converting the current ratio of a selected channel into a three-dimensional position value indicative of said surface reflecting said laser beam; and means for reporting said three-dimensional position value.

* * * * *

UNITED STATES PATENT AND TRADEMARK OFFICE
CERTIFICATE OF CORRECTION

PATENT NO. : 5,554,858
DATED : September 10, 1996
INVENTOR(S) : Costa et al.

It is certified that error appears in the above-identified patent and that said Letters Patent is hereby corrected as shown below:

Claim 1, line 4 (column 5, line 22): Change "less" to --greater--

Signed and Sealed this

Thirteenth Day of January, 1998

Attest:

Attesting Officer

BRUCE LEHMAN

*Commissioner of Patents and Trademarks*